United States Patent [19]

Fujikawa

[11] Patent Number: 4,534,455

[45] Date of Patent: Aug. 13, 1985

[54] WHEEL HUB CLUTCH ASSEMBLY

[75] Inventor: Motoi Fujikawa, Anjo, Japan

[73] Assignee: Aisin Seiki Kabushiki Kaisha, Kariya, Japan

[21] Appl. No.: 524,668

[22] Filed: Aug. 19, 1983

[30] Foreign Application Priority Data

Aug. 26, 1982 [JP] Japan .................... 57-148317

[51] Int. Cl.³ .......................... F16D 27/09
[52] U.S. Cl. ................... 192/40; 192/67 R; 192/84 B; 192/84 C
[58] Field of Search ............ 192/40, 67 R, 84 B, 192/84 C

[56] References Cited

U.S. PATENT DOCUMENTS

| | | | |
|---|---|---|---|
| 2,757,768 | 8/1956 | Landerer | 192/67 R |
| 2,875,876 | 3/1959 | Rudisch | 192/67 R |
| 2,883,025 | 4/1959 | McKim | 192/67 R |
| 3,071,226 | 1/1963 | Fujita | 192/84 B |
| 3,123,169 | 3/1964 | Young et al. | 192/40 |
| 3,217,847 | 11/1965 | Petrak | 192/67 R |
| 3,327,823 | 6/1967 | Miller | 192/84 C |
| 3,669,231 | 6/1972 | Schindel et al. | 192/84 C |
| 4,192,411 | 3/1980 | Fogelberg | 192/67 R |
| 4,232,772 | 11/1980 | Brissey et al. | 192/84 C |
| 4,262,785 | 4/1981 | Anderson et al. | 192/67 R |
| 4,343,386 | 8/1982 | Schafer et al. | 192/67 R |
| 4,352,418 | 10/1982 | Teraoka | 192/67 R |
| 4,382,495 | 5/1983 | Fleitas | 192/67 R |

Primary Examiner—Alan Cohan
Assistant Examiner—John A. Rivell
Attorney, Agent, or Firm—Oblon, Fisher, Spivak, McClelland & Maier

[57] ABSTRACT

An electrically operated wheel hub clutch assembly comprises a cylindrical body of magnetic material integrally formed therein with an internal spline and to be fastened to the outer end of a wheel hub, an inner sleeve member of non-magnetic material fixedly mounted on the outer end of an axle and located within the cylindrical body, a cylindrical clutch member of magnetic material integrally formed with an external spline to be engaged with the internal spline and axially slidably mounted on the sleeve member for rotation therewith; a spring for biasing the clutch member toward an unlocked position in which the external spline is disengaged from the internal spline, an annular core fixedly mounted on the outer end portion of an axle tube and having a cylindrical portion opposed to the inner end portion of the clutch member, and a magnetic coil fixedly coupled over the cylindrical portion of the core and being responsive to an electric control signal to produce an axial attraction force between the clutch member and the core.

4 Claims, 2 Drawing Figures

WHEEL HUB CLUTCH ASSEMBLY

BACKGROUND OF THE INVENTION

The present invention relates to a wheel hub clutch assembly adapted for use in automotive vehicles of the four-wheel drive type, and more particularly to an electrically operated wheel hub clutch assembly responsive to an electric control signal for automatically effecting engagement between a drive axle and a wheel hub to establish four-wheel drive.

In such conventional electrically operated wheel hub clutch assemblies, a magnetic coil is assembled within a casing for the assembly which is mounted on a wheel hub for rotation therewith, and an electric coupling of the rotary type such as a slip ring is mounted within the casing for connecting the magnetic coil to an electric power source. Due to provision of the electric coupling, the conventional wheel hub clutch assembly is large in size and complicated in its construction, resulting in high production cost.

SUMMARY OF THE INVENTION

It is, therefore, a primary object of the present invention to provide an improved electrically operated wheel hub clutch assembly which is designed to be small in size and simple in its construction.

According to the present invention briefly summarized there is provided an electrically operated wheel hub clutch assembly for automotive vehicles having a driveable axle rotatable in a stationary axle tube, a wheel hub of magnetic material rotatable on the axle tube, and an electric control circuit to produce an electric control signal therefrom when the axle is subjected to rotation under power. The wheel hub clutch assembly comprises a cylindrical body of magnetic material integrally formed therein with a first set of clutch teeth and to be fastened to the outer end of the wheel hub, an inner sleeve member of non-magnetic material fixedly mounted on the outer end of the axle and located within the cylindrical body, a cylindrical clutch member of magnetic material integrally formed with a second set of clutch teeth to be engaged with the first set of clutch teeth and axially slidably mounted on the inner sleeve member for rotation therewith, resilient means for biasing the clutch member toward an unlocked position in which the second set of clutch teeth is disengaged from the first set of clutch teeth, an annular core fixedly mounted on the outer end portion of the axle tube and having a cylindrical portion opposed to the inner end portion of the clutch member, and a magnetic coil fixedly coupled over the cylindrical portion of the core and being responsive to the electric control signal from the control circuit to produce an axial attraction force between the clutch member and the core thereby to move the clutch member toward a lock position in which the second set of clutch teeth is engaged with the first set of clutch teeth.

BRIEF DESCRIPTION OF THE DRAWINGS

Additional objects and advantages of the present invention will be more readily apparent from the following detailed description of a preferred embodiment thereof when taken together with the accompanying drawings in which.

DETAILED DESCRIPTION OF THE PREFERRED EMBODIMENT

Figure 1:
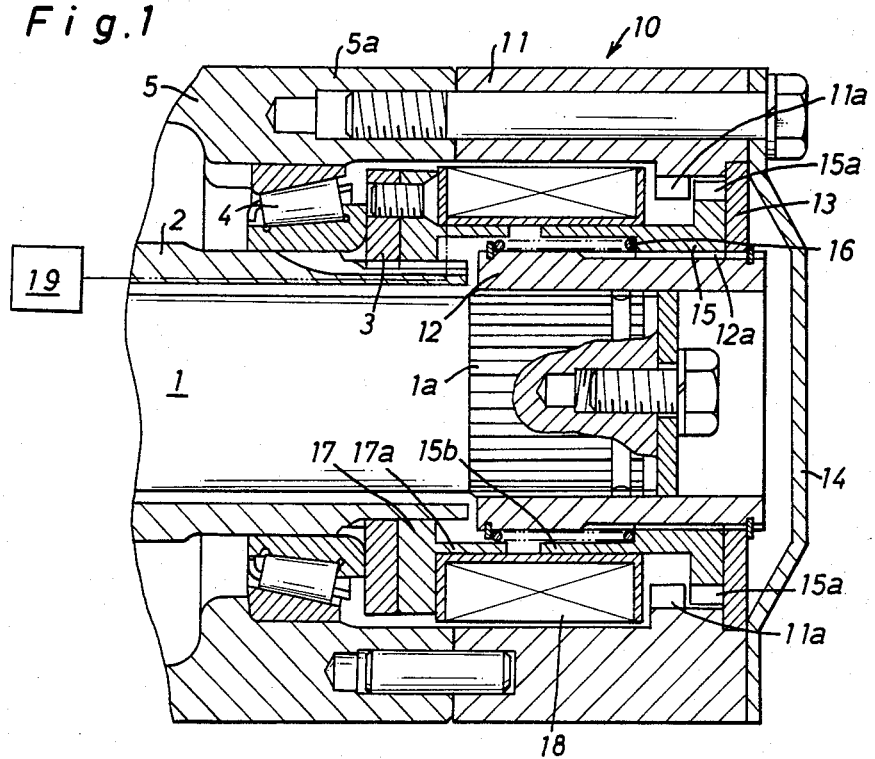
FIG. 1 is a sectional view of an electrically operated wheel hub clutch assembly in accordance with the present invention, in which a cylindrical clutch member is in its unlocked position.
Figure 2:
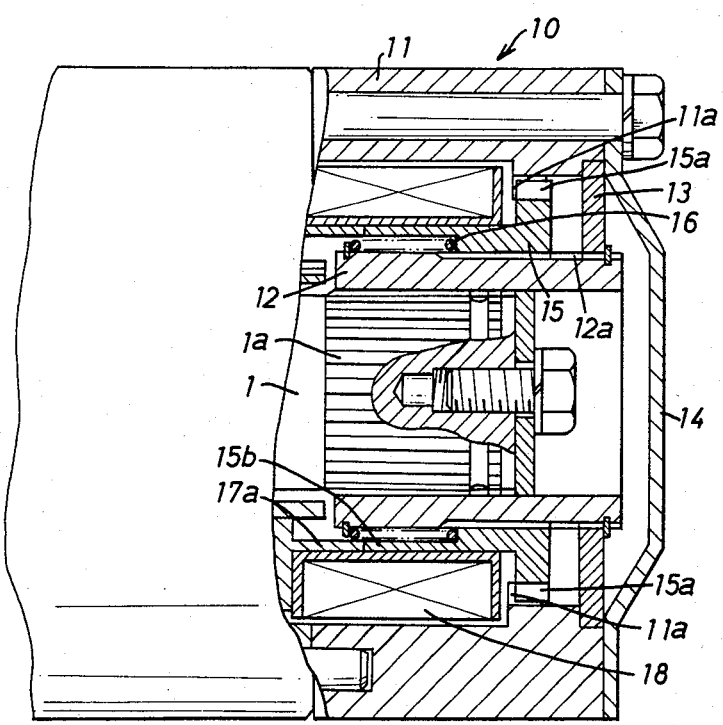
FIG. 2 is a sectional view of the wheel hub clutch assembly, in which the clutch member is in its lock position.

Referring now to the drawings there is illustrated an axle 1 of a vehicle which is rotatably supported in a stationary axle tube 2. The axle 1 is arranged to be driven in four-wheel drive of the vehicle and has an external spline 1a at its outer projection. The axle 1 is operatively connected at its inner end to a differential gearing (not shown) through a universal joint (not shown), the differential gearing being connected to a prime mover of the vehicle through a transfer mechanism (not shown). Mounted on the outer end of axle tube 2 is a wheel hub 5 of iron which is rotatably supported in place by means of a tapered roller bearing 4 of iron. The roller bearing 4 is fastened in place on the outer end of axle tube 2 by means of a lock nut 3 of iron. In such arrangement, the wheel hub 5 is arranged to be operatively connected to the axle 1 through an electrically operated wheel hub clutch assembly 10 in accordance with the present invention.

The electrically operated wheel hub clutch assembly 10 is arranged to drivingly connect the axle 1 to the wheel hub 5 in response to an electric control signal from an electric control circuit described later. The clutch assembly 10 comprises a cylindrical body 11 of iron fixed by bolts to the outer end of wheel hub 5, and an inner sleeve member 12 of non-magnetic metal such as stainless steel fixedly mounted on the outer projection of axle 1 by means of a spline connection. The cylindrical body 11 is provided at its outer end with an annular metal bearing 13 of brass which is arranged to rotatably support the cylindrical body 11 on the inner sleeve member 12, and a cover plate 14 is secured to the outer end of body 11 to close the interior of body 11.

The cylindrical body 11 is integrally formed at its inner peripheral wall with an internal spline 11a. In the interior of body 11 a cylindrical clutch member 15 is axially slidably mounted on inner sleeve member 12 and biased outwardly by a compressed coil spring 16 of non-magnetic metal such as stainless steel. The clutch member 15 is integrally formed at its annular flange with an external spline 15a to be engaged with the internal spline 11a of body 11 in clutching operation. The clutch member 15 has an internal spline in engagement with an external spline 12a of inner sleeve member 12 for effecting a drive torque transmission between axle 1 and wheel hub 5 in the clutching operation.

Assembled on the outer end of axle tube 2 are an annular core 17 and a magnetic coil 18 in place. The annular core 17 is secured to lock nut 3 by screws threaded thereto and is integrally formed with a cylindrical portion 17a which is opposed to an inner cylindrical portion 15b of clutch member 15. The magnetic coil 18 is fixedly coupled over the cylindrical portion 17a of core 17, and the inner cylindrical portion 15b of clutch member 15 is arranged to be slidable within a bobbin of magnetic coil 18. In such arrangement of the magnetic coil 18, a magnetic circuit is formed by lock nut 3, bearing 4, wheel hub 5, cylindrical body 11, internal spline 11a, external spline 15a, clutch member 15 and core 17. Thus, the magnetic coil 18 is arranged to be energized under control of an electric control circuit 19. When the axle 1 is conditioned to be driven under control of the transfer mechanism of the vehicle, the electric control circuit 19 produces an electric control signal therefrom for energization of the magnetic coil 18. When the drive of axle 1 is disconnected under control of the transfer mechanism, the electric control signal disappears to deenergize the magnetic coil 18. At the initial stage of energization of magnetic coil 18, an electric current at a high value is applied to the magnetic coil 18, and subsequently the electric current is maintained at a low value during energization of the magnetic coil 18.

From the above description, it will be understood that such main component parts as cylindrical body 11, inner sleeve member 12, clutch member 15, coil spring 16, core 17, magnetic coil 18 and the like are assembled in a simple construction within a confined space without any provision of a conventional electric coupling such as a slip ring. In use of the wheel hub clutch assembly 10, the magnetic coil 18 is deenergized under a condition where the axle 1 is disconnected from the prime mover under control of the transfer mechanism of the vehicle. Under such inoperative condition of the wheel hub clutch assembly 10, the clutch member 15 is held in its unlocked position by the biasing force of compressed coil spring 16, and the external spline 15a of clutch member 15 is disengaged from the internal spline 11a of body 11 to permit free rotation of the wheel hub 5 on axle tube 2. When the axle 1 is conditioned to be driven under control of the transfer mechanism, the magnetic coil 18 is applied with an electric current at a high value in response to an electric control signal from the electric control circuit 19 to produce a large axial attraction force between the cylindrical portion 15b of clutch member 15 and the cylindrical portion 17a of core 17. In such clutching operation, the clutch member 15 is moved by the large axial attraction force against the biasing force of coil spring 16 and is brought into engagement with the internal spline 11a of body 11 to effect a drive torque transmission between axle 1 and wheel hub 5 through the clutch assembly 10. Subsequently, the electric current is maintained at a low value to restrain consumption of the electric power and occurrence of heat during energization of the magnetic coil 18.

Having now fully set forth both structure and operation of a preferred embodiment of the present invention, various other embodiments as well as certain variations and modifications of the embodiment herein shown and described will obviously occur to those skilled in the art upon becoming familiar with the concept underlying the invention. It is to be understood, therefore, that within the scope of the appended claims, the invention may be practiced otherwise than as specifically set forth herein.

What is claimed is:

1. An electrically operated wheel hub clutch assembly for automotive vehicles having a driveable axle rotatable in a stationary axle tube, a wheel hub of magnetic material rotatable on said axle tube, and an electric control circuit to produce an electric control signal therefrom when said axle is subjected to rotation under power, the wheel hub clutch assembly comprising:

a cylindrical body of magnetic material integrally formed therein with a first clutch element and to be fastened to the outer end of said wheel hub;

an inner sleeve member of non-magnetic material fixedly mounted on the outer end of said axle and located within said cylindrical body;

a cylindrical clutch member of magnetic material integrally formed with a second clutch element to be engaged with the first clutch element of said body and axially slidably mounted on said inner sleeve member for rotation therewith;

resilient means for biasing said clutch member toward an unlocked position in which the second clutch element is disengaged from the first clutch element;

an annular core fixedly mounted on the outer end portion of said axle tube and having a cylindrical portion opposed to the inner end portion of said clutch member; and a magnetic coil fixedly coupled over the cylindrical portion of said core and being responsive to the electric control signal from said electric control circuit to produce an axial attraction force between said clutch member and said core so as to move said clutch member toward a lock position in which the second clutch element of said clutch member is engaged with the first clutch element of said body.

2. An electrically operated wheel hub clutch assembly as claimed in claim 1, wherein a lock nut is fastened to the outer end portion of said axle tube to position a bearing for support of said wheel hub on said axle tube, and wherein said annular core is secured to said lock nut.

3. An electrically operated wheel hub clutch assembly as claimed in claim 1, wherein said resilient means is a compressed coil spring surrounded by the inner end portion of said clutch member and being engaged at its one end with said inner sleeve member and at its other end with said clutch member.

4. An electrically operated wheel hub clutch assembly as claimed in claim 1, further comprising a metal bearing mounted on the outer end of said inner sleeve member to rotatably support the outer end of said cylindrical body on said sleeve member.

* * * * *